Aug. 27, 1929.    R. S. BLAIR    1,726,466
EYEGLASS CONSTRUCTION
Filed Feb. 15, 1924    2 Sheets-Sheet 1
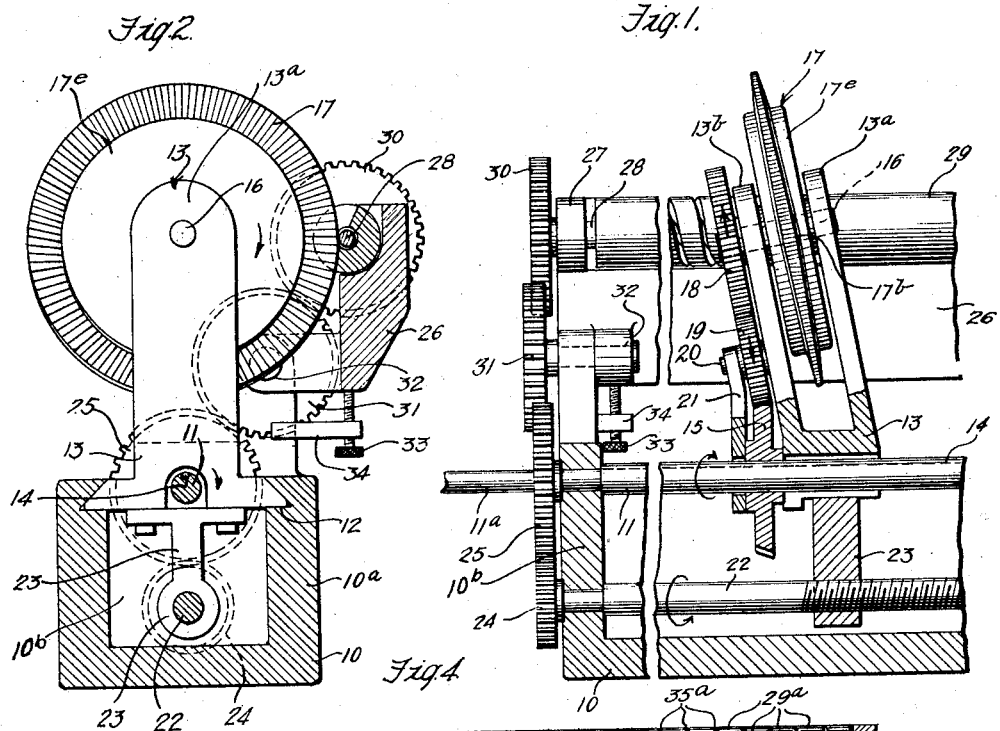
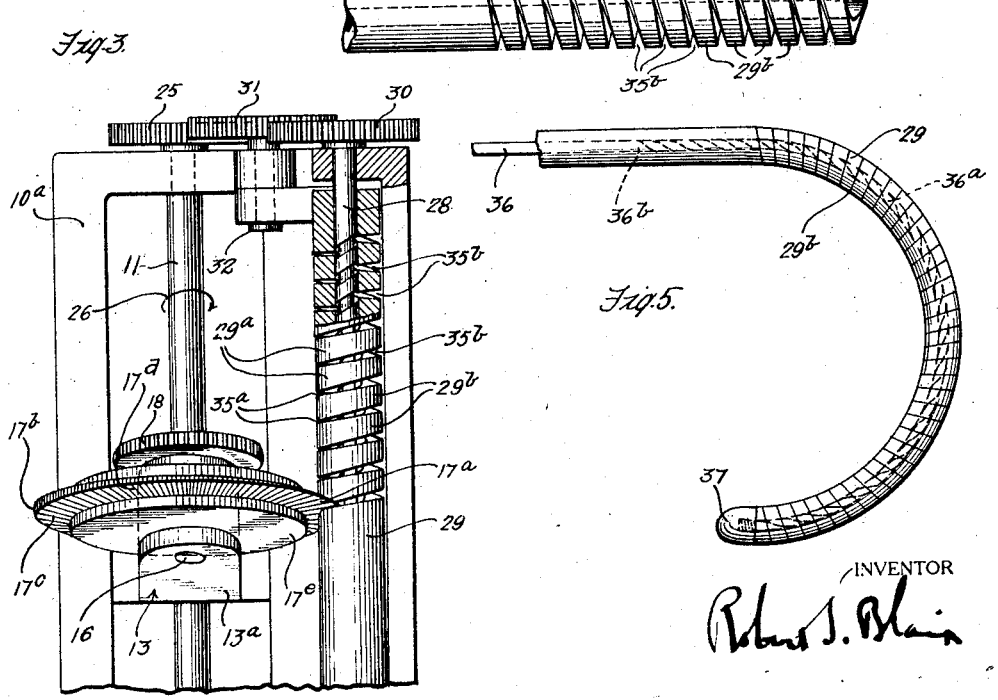

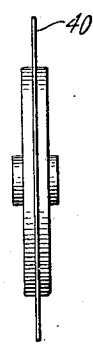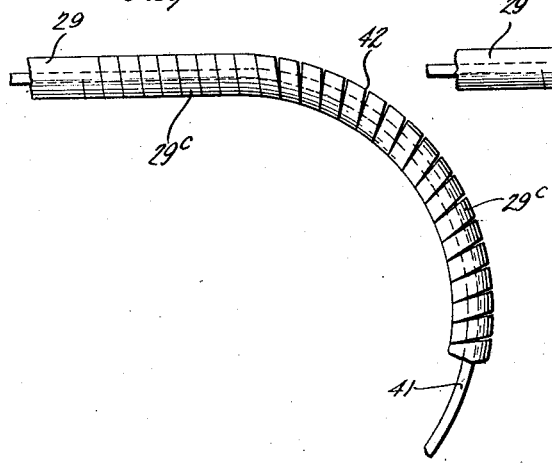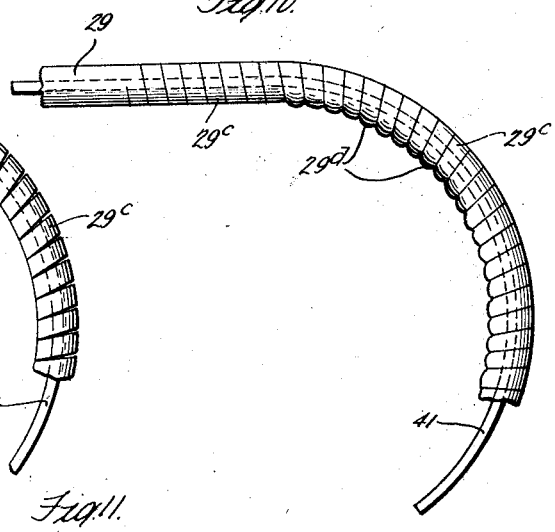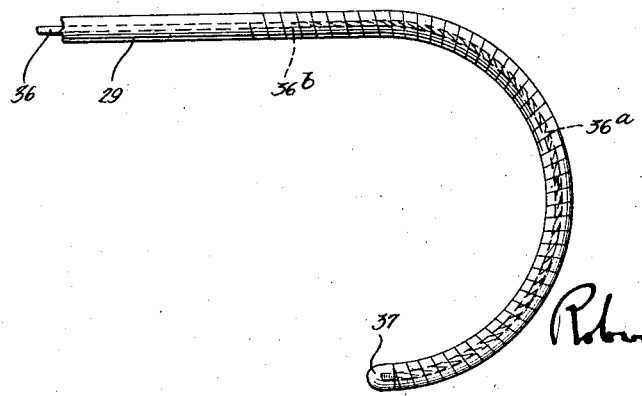

Patented Aug. 27, 1929.

1,726,466

UNITED STATES PATENT OFFICE.

ROBERT S. BLAIR, OF STAMFORD, CONNECTICUT, ASSIGNOR TO BAY STATE OPTICAL COMPANY, OF ATTLEBORO, MASSACHUSETTS, A CORPORATION OF MAINE.

EYEGLASS CONSTRUCTION.

Application filed February 15, 1924. Serial No. 693,003.

This invention relates to eyeglass construction and with regard to its more specific features to the construction of eyeglass temple bars.

One of the objects of the invention is to provide an eyeglass temple bar construction which is practical and efficient and adapted to meet the requirements of practical use in a highly satisfactory manner. Another object is to provide a construction of the above nature particularly adapted to afford the wearer a high degree of comfort and convenience. Another object is to provide such a construction, neat in appearance and free from objectionable characteristics annoying to the wearer. Another object is to provide a practical and efficient art by means of which temple bars of the above nature may be conveniently constructed. Other objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claims.

In the accompanying drawings in which are shown one or more possible embodiments of the several mechanical features of this invention.

Figure 1 is a front elevation partly cut away and partly in section showing a form of apparatus adapted for use in making eyeglass temple bars, a temple bar member being shown in operative position therein.

Figure 2 is a transverse sectional view of the apparatus shown in Figure 1.

Figure 3 is a plan view of the same apparatus.

Figure 4 shows a portion of the temple bar member after leaving the apparatus of Figures 1 to 3.

Figure 5, on a smaller scale than Figure 4, shows the rear portion of a completed temple bar.

Figure 6 shows a temple bar member at an early stage in the process of manufacture.

Figure 7 is a modified form of cutter adapted to be substituted in the apparatus of Figures 1 to 3.

Figure 8 shows the member of Figure 6 after operation thereon by the cutter of Figure 7.

Figure 9 shows the member at a later stage in the process of its manufacture.

Figure 10 shows the same member at a still later stage, and

Figure 11 shows the rear portion of a completed eyeglass temple bar.

Similar reference characters refer to similar parts throughout the several views of the drawings.

Referring now to the drawings in detail, and first to Figures 1 to 3, there is shown a supporting base member 10 which is provided with upstanding side walls $10^a$ and end walls $10^b$ forming a trough-like construction open at its top. Journaled in the left-hand end wall $10^b$ is a shaft 11 the other end of which it will be understood is journaled in a similar manner in a right-hand end wall, this latter part together with the right-hand end portion of the apparatus being not shown in the drawing so as not to unnecessarily encumber the same. Supported in longitudinal ways 12 in the side walls $10^a$ of the base member 10 is a carriage 13 which is thus movable in the ways 12 back and forth longitudinally of the base member 10. The shaft 11 passes freely through the carriage 13 and is splined as indicated at 14. Driven through this spline 14 is a gear 15 supported about the shaft 11 and movable with the carriage 13. The carriage 13 has a pair of upright inclined supporting arms $13^a$ in which is journaled an inclined shaft 16 carrying a tool 17 which will be later described in detail. Upon the shaft 16 is a gear 18 meshing with an idler gear 19 supported by a stud shaft 20 journaled in the supporting arm $13^b$ and a suitable bracket 21, which latter extends downwardly fitting loosely about the shaft 11 and holding the gear 15 from lateral movement with respect to the carriage 13.

The shaft 11 is provided with an extension $11^a$ through which it is adapted to be rotated by any suitable source of power. The shaft 11 through the spline 14 rotates the gear 15, which in turn through the idler 19 and gear 18, rotates the tool 17. The ratio of the gearing 15, 19 and 18 is preferably such that the rotative speed of the shaft 16 carrying the tool 17 is the same as that of the driving shaft 11, A lead screw 22 is journaled in the end walls 10^b of the base 10 below the shaft 11 and is in threaded engagement with a downwardly projecting boss 23 of the carriage 13. The lead screw 22 is driven through a gear 24 thereon meshing with a gear 25 upon the drive shaft 11^a. The shaft 11 therefore being rotated in the direction indicated by the arrows, the lead screw 22 is rotated in the opposite direction as indicated by the arrows and through the boss 23 moves the carriage 13 along the ways 12 toward the right. During this movement of the carriage the gear 15 is continually rotated through the spline 14, thus rotating the tool 17.

Projecting upwardly at an incline from the rear wall 10^a of the base 10 is a supporting plate 26. In a boss 27 at the left-hand end of the plate 26 is journaled a shaft 28 which forms a mandrel for supporting a tubular member 29 in position to be operated upon by the tool 17 as will presently be described. Secured to this shaft or mandrel 28 is a gear 30 in mesh with an idler gear 31 which in turn meshes with the gear 25 upon the driving shaft 11^a. The ratio of the gearing 25, 31 and 30 is preferably such that the rotative speed of the mandrel 28 is the same as that of the shaft 11. As described above the rotative speed of the tool 17 is also the same as that of the shaft 11 so that thus the tool and the work supporting mandrel have the same rotative speed, and their direction of rotation is also the same.

The rear supporting plate 26 is preferably pivoted to the base 10 as at 32 so that the mandrel 28 may be swung away from the tool 17 to a sufficient extent to permit the tool 17 to clear the surface of the tubular member 29, so as to permit the tubular member to be positioned upon or removed from the mandrel 28 in an axial direction. This movement of the plate 26 is not sufficient to move the gears 30, 31 and 25 out of mesh and may be controlled by a screw 33 threaded through a bracket 34. The mandrel 28 is supported at its right-hand end in any suitable form of removable bearing mounted upon the right-hand end of the supporting plate 26. In order to position a tubular member 29 upon the mandrel 28 therefore, the supporting plate 26 is swung substantially to the position indicated by the dotted lines in Figure 2, and the removable right-hand bearing is removed. The tubular member may then be slipped over the mandrel in an axial direction from the right and preferably has a driving fit upon the mandrel 28 so that it fits tightly thereon and rotates therewith.

The tubular member 29 is of celluloid and is adapted to form the outer portion of an eyeglass temple bar. It may be here noted that the term celluloid as employed herein is to be interpreted in a broad sense throughout to include various non-metallic substances of the general nature of celluloid and adapted for use in making eyeglass parts. The tubular member 29 may be made in any desired manner and its inner diameter is preferably substantially that of the metallic temple bar member over which it is adapted to fit and form a covering as will be later described. The tubular member after formation is preferably cut to a length a little longer than is desired for the completed temple bar member and is thereupon positioned upon the mandrel 28 as above described, the mandrel being of sufficient length to accommodate the tubular member between its two end bearings.

The tool 17 preferably takes the form of a circular cutter provided with fine peripheral teeth. As the tubular member 29 rotates with the mandrel 28 the rotating cutter 17 cuts a slot in the tubular celluloid member. Due to the movement of the carriage 13 by the lead screw 22, this slot cut in the member 29 follows the path of a spiral and the inclination of the axis of the cutter, as has been described, assists in this spiral cutting action. The rotative speed of the cutter shaft 16 and of the mandrel 28 are the same, but the contacting surfaces of the cutter and of the tubular member 29 move in opposite directions and the cutter 17 is of substantially greater diameter than the tube so that the cutting action of the cutter 17 readily takes place.

At the start of the cutting operation the celluloid tube having been placed upon the mandrel 28, as has been described, the supporting plate 26 is swung inwardly toward the cutter 17 by the screw 33 so that the cutter cuts completely through the wall of the tube as indicated in Figure 2. The mandrel 28 is preferably provided with a spiral groove 28^a into which the periphery of the cutter projects. Since the mandrel 28, the cutter 17 and the lead screw 22 are always geared together the cutter 17 will always strike the groove 28^a no matter where the cutting operation is commenced. Preferably the cutting operation is started a short distance from the left-hand end of the tube 29 rather than at the end so that the end of the tube may retain its tight grip upon the mandrel 28.

The periphery or edge of the cutter 17 is of non-uniform width. Preferably at one side it is narrowed to substantially a knife-edge and gradually increases in width in both directions from this portion to its opposite portion 180° therefrom. This is clearly brought out in Figure 3 wherein the portion of minimum width is shown at 17^a at this instant operating upon the celluloid tube, and the portion of maximum width is shown on the other side of the axis of the cutter at 17ᵇ. The effect of this variation in the width of the periphery of the cutter 17 is that the spiral slot cut thereby in the tube 29 is of non-uniform width. The slot varies in width along its length alternately between a minimum and a maximum. Since the speeds of rotation of the tube 29 and of the cutter 17 are the same, and since thus the tube makes one rotation while the cutter is making one rotation, the portions of the slot of minimum width all come on one side of the axis of the tube and the portions of the slot of maximum width all come on the opposite side of the axis of the tube. This is clearly brought out in Figure 3 wherein the portions 35ᵃ of the slot represent the portions of minimum width and the portions 35ᵇ of the slot represent the portions of maximum width. The portions of the slot on one side of an axial plane through the celluloid tube are therefore of greater width than the portions of the slot on the opposite side of the plane. The structure of the tube thus cut is that of a spiral cable comprising a strip of celluloid alternately varying in the width of its dimension lengthwise of the cable. The widest portions 29ᵃ of the strip are on one side of the axis of the tube and the narrowest portions 29ᵇ of the strip are all on the opposite side of the axis.

The wider portion 17ᵇ of the cutter preferably increases slightly in width toward the axis of the cutter. This is brought out in Figure 1 wherein the cutter is viewed looking radially at this wide portion 17ᵇ so that its sides 17ᶜ diverging toward the axis may be seen. As shown in Figure 3 these sides 17ᶜ are preferably provided with radial teeth. The portion of the slot cut by this portion 17ᵇ therefore converges toward the axis of the tube as is shown at 35ᵇ in the sectioned portion of the tube in Figure 3. The narrower portion 17ᵃ of the cutter is of substantially uniform thickness inwardly to the hub 17ᵉ and the radial cutting teeth on the sides 17ᶜ preferably terminate substantially as indicated at 17ᵈ.

The celluloid tube 29 is cut as above described throughout sufficient of its length to form the curved portion or ear piece of the temple bar of which it is to form a part. The tube is then removed from the apparatus, a portion thereof after removal being shown in Figure 4. In Figure 5 there is shown a metallic eyeglass temple bar member 36 which it will be understood extends forwardly and is joined to an eyeglass rim or other lens mounting in the usual manner. The rear portion of this metallic temple bar member 36 is curved to the contour of an ear-piece and at its curved portion is preferably flexible, being formed, for example, from a spirally coiled wire member as indicated at 36ᵃ, whereby the desired degree of flexibility is obtained. This flexible portion of the member 36 may comprise its portion extending rearwardly from a point such as 36ᵇ, for example. The uncut portion of the celluloid tube 29 is of substantially the length of the straight portion of the metallic member 36, the cut portion thereof being as above mentioned of substantially the length of the curved portion of the temple bar.

The celluloid tube is now slipped over and into place upon the metallic member 36 and in such position thereon that the widest portions 29ᵃ of the strip form the outer surface of the curved ear piece and the narrowest portions 29ᵇ of the strip accordingly form the inner surface of the curved ear piece. The forward end of the uncut portion of the tube is then secured to the forward end of the metallic member 36 in any manner as desired. The extreme rear end of the member 36 is preferably threaded and a celluloid cap 37 is provided therefor. This cap 37 being threaded into place, the coils of the tube 29 are forced snugly together. The gaps between adjacent coils are thereby closed. Because of the variation in the width of the celluloid strip comprising the cable or tube, the widest portions forming the outside of the curve and the narrowest portions forming the inside of the curve, the portions of the coils on the inside of the curve may be drawn up closely together without any gaps opening between the coils on the outer side of the curve. This is of distinct practical importance in that small gaps between coils of the cable tend to catch the hair of the wearer and are thus extremely objectionable. It will be seen that by forming the spiral cable, as above described, with the coils gradually decreasing in width from the outer side of the curve to the inner side of the curve, this difficulty is overcome. It will further be seen that the inwardly converging slot portion cut by the sides 17ᶜ of the wide portion 17ᵇ of the cutter further facilitates the compact drawing together of the adjacent coils. The art of making these temple bars as described is one which may be conveniently and expeditiously carried on.

Referring now to Figure 7, there is shown a modified form of cutter adapted to be substituted for the cutter 17 shown in Figures 1, 2 and 3. This cutter comprises a circular toothed member 40 the cutting periphery of which is uniform in width and preferably as narrow as practicable and consistent with proper strength. In Figure 6 there is shown a tubular member 29 of celluloid similar to that shown in the preceding figures. And in Figure 8 is shown this same tube after being operated upon by the cutter 40 in the apparatus of Figures 1, 2 and 3. The cutter in this instance being of uniform thickness, the spiral slot cut in the tube is of uniform width and the resulting strip comprising the coils 29ᶜ is of substantially uniform width throughout.

In Figure 9 there is shown a curved mandrel 41 preferably of substantial rigidity and having substantially the curvature of the eyeglass temple bar of which the tube 29 is to form a part. The celluloid tube having been cut as shown in Figure 8 is placed upon this curved mandrel 41 as shown. At the curved portion of the spiral cable comprising the coils 29ᶜ, the adjacent coils fit closely together along the inside of the curve, but on the ouside of the curve the coils spread apart leaving gaps as indicated at 42. In accordance with the process of this invention now being described, the curved portion of this spiral cable or spirally cut celluloid tube is now softened upon the mandrel 41 by heating or other suitable treatment. The forward uncut portion of the tube 29 is held from axial movement along the mandrel 41 by any suitable means and the softened coils of the curved portion are forced together by thrusting the cable forwardly along the curved mandrel from the rear. This forcing together of the coils is continued until the coils come together at the outside of the curve closing the gaps 42. This results in a squeezing out of the softened celluloid on the inside of the curve as indicated at 29ᵈ in Figure 10.

The celluloid is now permitted to harden again and thereupon the projecting parts 29ᵇ are removed by cutting to restore the cable to its original round, even contour. The tube is then removed from the mandrel 41 and is in readiness for mounting upon the metallic temple bar member 36 shown in Figure 11. It will be seen that after the softening and compressing steps above described, the coils 29ᶜ of the curved portion of the temple bar are of greater width on the outside of the curve than on the inside. The portions of the coils on one side of an axial plane through the curved ear piece are of greater width than the portions thereof on the other side of the same plane. The strip of celluloid which comprises the cable is therefore of varying width alternately changing in width gradually from a maximum at its outer portions to a minimum at its inner portions. There are no gaps between adjacent coils to collect dirt or catch in the hair. The cap 37, shown in Figure 11, holds the celluloid member in place upon the metallic member 36 substantially as described with regard to Figure 5.

From the above it will be seen that there are herein provided a temple bar construction and art of producing the same which embody the features of this invention and attain many practical and useful advantages.

As many possible embodiments may be made of the mechanical features of the above invention and as the art herein described might be varied in various parts all without departing from the scope of the invention, it is to be understood that all matter herein set forth or shown in the accompanying drawings is to be interpreted as illustrative and not in a limiting sense.

I claim as my invention:

1. In construction for eyeglass temple bars, a tubular member having formed therein a spiral slot alternately changing in width along its length between two substantially fixed limits.

2. In construction for eyeglass temple bars, a tubular member having formed therein a spiral slot gradually varying in width between a maximum and a minimum at intervals along its length.

3. In construction for eyeglass temple bars, a tubular member having formed therein and extending about the axis thereof a slot having a width greater at its portion on one side of said axis than at its portion on the opposite side of said axis.

4. In construction for eyeglass temple bars, a tubular member having formed therein a spiral slot encircling said member a plurality of times, the portions of said slot on one side of the axis of said member being of greater width than the portions thereof on the opposite side.

5. In construction for eyeglass temple bars, a tubular member having formed therein a spiral slot extending through the walls thereof and of a greater width at its portions on one side of the axis of said member than at its portions on the opposite side.

6. In construction for eyeglass temple bars, a tubular member having formed therein a spiral slot extending through the walls thereof, said slot being of varying width, the width of the portions thereof on one side of an axial plane through said member being greater than the width of the portions thereof on the other side of said plane.

7. In construction for eyeglass temple bars, a tubular member having formed therein a slot extending about the axis thereof, the side walls of said slot throughout a portion of its length converging toward the axis of said member.

8. In construction for eyeglass temple bars, a tubular member having formed thereon a spiral slot encircling said member a plurality of times, the side walls of said slot throughout its portions on one side of an axial plane through said member converging toward the axis of said member.

9. In construction for eyeglass temple bars, a tubular member comprising a plurality of contiguous coils of celluloid, said coils being of lesser dimension lengthwise of said tubular member at their portions on one side of an axial plane through said member than at their portions on the other side of said plane.

10. In construction for eyeglass temple bars, a tubular member comprising a spirally coiled strip of celluloid gradually varying in width between a maximum and a minimum at intervals along its length.

11. In construction for eyeglass temple bars, a tubular member comprising a spirally coiled strip of celluloid, the portions of the coils thereof on one side of the axis of said tubular member being greater in width than the portions of said coils on the opposite side of said axis.

12. In construction for eyeglass temple bars, a tubular member comprising a spirally coiled strip of celluloid gradually varying in width between a maximum and a minimum at intervals along its length, the portions thereof of minimum width comprising the wall portion of said tubular member substantially diametrically opposite the wall portion thereof comprising the portions of said strip of maximum width.

13. In construction for eyeglass temple bars, a curved tubular member comprising a spirally coiled strip of celluloid, said strip being of greater width at its portions forming the outer side of said curve than at its portions forming the inner side of said curve.

14. In construction for eyeglass temple bars, a curved tubular member comprising a spirally coiled strip of celluloid, said strip gradually decreasing in width from its portions at the outer side of said curve to its adjoining portions on the inner side of said curve.

15. In construction for eyeglass temple bars, in combination, a curved inner core member of metal, and an outer covering thereon comprising a celluloid tube, said tube comprising a spirally coiled strip the portions thereof on the outside of the curve being of greater width than the portions thereof on the inside of the curve.

16. The herein described art of making eyeglass temple bars which consists in forming a tubular member of celluloid and removing material therefrom in the path of a spiral, a greater width of material being removed at the portions of said spiral on one side of the axis of said tube than on the opposite side.

17. The herein described art of making eyeglass temple bars which consists in forming a tubular member of celluloid, spirally slotting said tube with a greater width of slot on one side of the axis thereof than on the opposite side, and curving said slotted tube with its side having said wider portions of the slot forming the inner side of the curve.

18. The herein described art of making eyeglass temple bars which consists in forming a tubular member of celluloid, spirally slotting said tube with a greater width of slot on one side of the axis thereof than on the opposite side, and placing said slotted tube upon a curved metallic core member with its side having said wider portions of said slot positioned at the inner side of the curve.

In testimony whereof, I have signed my name to this specification this 14th day of February, 1924.

ROBERT S. BLAIR.